Patented Aug. 13, 1940

2,211,688

UNITED STATES PATENT OFFICE 2,211,688

METHOD OF TREATING OIL AND GAS WELLS

Harold T. Byck, Berkeley, John W. Freeland, San Francisco, and Howard C. Lawton, Berkeley, Calif., assignors to Shell Development Company, San Francisco, Calif., a corporation of Delaware No Drawing. Application July 12, 1939, Serial No. 283,970

1 Claim. (Cl. 255—1)

This invention pertains to the treatment of oil and gas wells and is more specifically concerned with a method for solidifying unstable formations and sealing off water and gas layers traversed by wells.

Besides oil-bearing formations, wells usually pass through a variety of formations such as layers of porous, loose or unstable ground, water-bearing layers, and gas-bearing layers.

It is of great importance to seal off or solidify porous or unstable formations penetrated by the drill to avoid excessive loss of the drilling fluid during drilling. This is usually accomplished by the drilling fluid itself which forms a thin, adherent, impermeable mud sheath as a seal on the walls of the borehole.

It is likewise highly important to seal off or solidify porous or unstable formations such, for example, as heaving shale, since they cause considerable trouble by caving in, both during drilling, when they "freeze" the drilling tools, and during production, when they clog the liners and screens, and reduce the fluid flow from the well.

Water layers must be sealed off, as required by law, to prevent the penetration of water into the oil-bearing formations. Production of water with oil from wells is, moreover, highly undesirable since it causes emulsions and corrosion of equipment.

Gas layers must be sealed off because an excessive production of gas is often wasteful and leads to a rapid lowering of the reservoir potential. Furthermore, unless the water and gas layers are sealed off before a well is subjected to an acidizing treatment, the effect of the acid will be greatest on the water layers, because of the miscibility of acid with water, and on the gas layers, because of their porosity, to the detriment of the oil layers. As a result of the treatment, the undesirable flow of water or gas will, therefore, be increased much more than the desired flow of oil.

It is the object of this invention to provide a chemical method of treatment for stiffening and solidifying and sealing off unstable, loose, heaving, caving or porous formations traversed by a borehole and for selectively sealing off water and gas layers without restricting the inflow of oil into a well.

It is a further object of this invention to provide a drilling fluid of improved plastering properties, which is capable of forming a thin, adherent, and impermeable mud sheath on the walls of the borehole, to prevent the loss of fluid into the formation, said drilling fluid being substantially unaffected by salt contaminations or increased temperatures.

It is another object of this invention to provide a method for attaining the foregoing objects by means of chemicals which are inexpensive, non-corrosive, non-poisonous, and non-volatile.

Briefly, the method of the present invention comprises introducing into wells a treating liquid containing a soluble alginate and capable of solidifying or plugging porous or unstable formations, or of promoting the ability of the drilling fluid to form an insoluble sheath or plug on the walls of the borehole or within the adjacent formations.

As soluble alginates, the alkali metal or ammonium salts of alginic acid may be mentioned as suitable for the purpose of this invention. Of these, the sodium salt is preferable from the standpoint of economy, since in most commercial processes the alginates in seaweed are extracted as the sodium salt. Likewise suitable for the present purpose are aqueous dispersions of Irish moss or chondrus family of seaweeds.

Since alginate solutions are often of high viscosity, viscosity-reducing agents may be added to or used along with the alginate solutions. Agents such as the following may be used for this purpose: water-soluble salts of organic materials of feebly-acidic properties, such as tannins, humins, lignins, extracts of wood, such as quebracho extract, etc., in admixture with alkali hydroxides, the water-soluble alkali metal pyrophosphates, meta-phosphates, and hexa-phosphates, or mixtures thereof. A mixture of sodium tannate and sodium pyrophosphate has been found especially effective for one type of treatment, while a mixture of quebracho extract and sodium hydroxide, which is commercially known as quebracho-soda, is preferable in other applications. However, in general, the use of quebracho-soda is preferred to avoid fermentation and its attendant loss in effect of the alginate.

The method of introducing these materials into the wells depends on the particular conditions encountered and the particular objective sought.

If the process of this invention is applied during the drilling of a well for the purpose of solidifying unstable formations and forming a mud sheath of particular strength on the walls of the borehole to prevent the escape of gases, the infiltration of water into the well or a loss of the circulation fluid into porous formations, and particularly in the event where the drilling fluid is liable to be contaminated by salts or subjected to increased temperature, an aqueous solution of a soluble alginate, such as sodium alginate, chondrus dispersion, etc., containing in suspension materials such as clay, shale, limestone, and/or, if desired, suitably ground weighting materials, such as barytes, galena, iron or lead oxide, oyster shells, etc., may be used for forming the drilling fluid in combination, if desired, with a viscosity-reducer, such as quebracho-soda.

Suspensions containing from about 0.1% to 1.0% and preferably about 0.6% of the alginate may be used, depending on the quality of improvement desired, the amount, type and particle size of the suspended material, and on the kind and extent of chemical treatment. To overcome impairment of plastering properties due to increased temperature or to improve plastering properties under normal conditions, suspensions containing from about 0.3 to 0.7% of the alginate are preferred. However, to avoid destruction of the plastering properties by salt contaminations, suspensions containing a combination of a soluble alginate and a small amount of quebracho-soda are preferred.

The functions of a drilling fluid are to lubricate and cool the bit, to carry the cuttings from the bit to the surface, to control formation pressures, and to form on the walls of the borehole a sheath capable of preventing or minimizing the penetration of the drilling fluid into the formation, and its loss therein.

As the drilling fluid is circulated in the borehole under a pressure exceeding that of the formation, its liquid component, together with the smaller colloidal or solid particles suspended therein, flows into the formation through the interstices, passages and pores between the grains of the formation sands. The larger clay or solid particles, however, become arrested between adjacent sand grains and act as plugs, decreasing the area of the flow passages therebetween, and allowing smaller clay particles to become in turn arrested and to act as plugs in said smaller passages. In the plugging of these smaller pores, the thixotropic structure developed by the drilling fluid serves as a support or mesh on which the smaller clay particles build. A drilling fluid of good plastering properties quickly forms in this manner a substantially liquid impervious mud sheath on the walls of the borehole.

Unfortunately, however, these properties, commonly referred to as plastering properties, are particularly sensitive to certain types of contamination frequently encountered during drilling, namely, contamination with salts capable of causing a partial or complete flocculation of the clay colloids of the drilling fluid. The flocculation of the clay colloids, that is, the agglomeration and aggregation of the small colloidal particles into larger non-colloidal particles, precludes the formation of a thixotropic structure by the drilling fluid and/or the plugging of the smaller pores or passages in the walls of the borehole and thus leads to a great loss of water or liquid from the drilling fluid into the formation. For example, a drilling fluid under 500 lbs. pressure lost 25.5 c.c. of water through a porous filter in thirty minutes; the same drilling fluid containing 10% common salt lost 54.0 c.c. of water in the same time. This impairment of the plastering properties of the drilling fluid may be brought about by the natural salinity of the brines encountered or by the penetration of salt domes by the drill where the solution of the formation quickly flocculates the drilling fluid, or by the necessity, for want of fresh water, of using sea water or other low quality water in making up the fluid. The plastering properties of drilling fluids are likewise impaired by increased temperature of the drilling fluid due to its contact with subsurface strata at elevated temperature and its absorption of the heat generated by the bit in penetrating the rock, which is one of the functions of a drilling fluid. This temperature increase causes temperature flocculation of the colloidal particles, flocculation due to increased solubility of flocculating salts, and accelerated flocculation by salts at elevated temperature as well as increased fluidity of the liquid medium in the drilling fluid. For example, the percentage increase in water loss from 70° F. to 175° F. for a group of six California muds ranged from about 65% to 157%.

A drilling fluid containing a soluble alginate shows improved plastering properties, including resistance to flocculation of the suspended colloids by salt contaminations or by increased temperature, as illustrated in Tables I and II hereinbelow, wherein low values for the loss of water through the mud sheath and the thickness of the mud sheath have been used as a measure of desirable plastering properties. The tables show by comparison the improved properties of drilling fluids or muds prepared according to this invention; Table I shows the effect of salt contamination and Table II the effect of increased temperature.

TABLE I

Effect on plastering properties of plain and salt water muds of sodium alginate and quebracho-soda (500 lbs. mud pressure)

| Mud | Water loss at end of 30 min. (cc.) | Sheath thickness (mm.) |
|---|---|---|
| BASE MUD: 85 LB. VENTURA GREY MUD | | |
| 1  Alone | 25.5 | 10.5 |
| 2  Plus quebracho-soda | 15.5 | 6.5 |
| 3  Plus 0.25% sodium alginate | 8.4 | 4.5 |
| 4  Plus quebracho-soda and 0.5% sodium alginate | 3.0 | 2.5 |
| BASE MUD: 85 LB. VENTURA GREY PLUS 10 GMS. NaCl/100 GMS. | | |
| 5  Alone | 54.0 | 22.5 |
| 6  Plus quebracho-soda | 41.0 | 16.5 |
| 7  Plus 0.25% sodium alginate | 50.0 | 21.0 |
| 8  Plus quebracho-soda and 0.5% sodium alginate | 18.0 | 8.0 |
| BASE MUD: SAME AS LAST, BUT DILUTED TO 75 LBS. | | |
| 9  Alone | 71.5 | 11.5 |
| 10 Plus quebracho-soda | 57.0 | 9.0 |
| 11 Plus 0.25% sodium alginate | 69.5 | 13.5 |
| 12 Plus quebracho-soda and 0.5% sodium alginate | 33.5 | 6.0 |

TABLE II

Effect of sodium alginate at elevated temperatures

| Mud | Cc. through core at temperatures shown | | Percent increase over temperature range | |
|---|---|---|---|---|
| | 70° F. | 200° F. | 70° F. | 200° F. |
| 1. Alone | 41.2 | >90.0 | +118.0 |  |
| 2. Plus 0.25% sodium alginate | 11.3 | 15.7 | +39.0 |  |
| Percent improvement | 72.5 | 82.5 | | |

It may be seen from Table I above that the plastering properties of straight drilling fluids or muds are markedly improved by the addition of small amounts of sodium alginate with or without quebracho-soda. This table further illustrates that formation salts flocculate the colloidal particles in ordinary untreated drilling fluids, and consequently prevent the development of a mud structure suitable for forming an impermeable mud sheath on the walls of the borehole. However, drilling fluids treated according to the present invention are not appreciably affected by salt contaminations; that is, the treated fluids are able to form the desirable thin, impermeable mud sheath on the well walls due to a quasiprotective-colloidal action of the alginate or its reaction products with materials like quebracho-soda or such as with salts to form a weak gel which is advantageous in promoting a thixotropic structure and subsequent formation of the desired mud sheath. It may also be seen from the table that while quebracho-soda alone is not particularly satisfactory in combating the effect of salt contaminations, its combination with an alginate is very effective in preventing the impairment of plastering properties by salt contaminations. Thus, in composition No. 1 the water loss and the mud sheath thickness are unsatisfactorily high, while upon the addition of sodium alginate and then quebracho-soda as in composition No. 4, these characteristics drop to the desirable low values. This improvement in plastering properties includes drilling fluids highly contaminated with salt (compositions 5–8) and those which are contaminated with salt and diluted (compositions 9–12).

In Table II it is shown that sodium alginate retains its effectiveness at high temperature; in fact a better percentage reduction in water loss was obtained at 200° F. than at 70° F.

If a treatment according to this invention is applied to a producing well having the usual casing and tubing, the following procedure may be followed if it is desired to seal off a water formation:

The well is first preferably filled with oil, and a desired amount of an aqueous treating liquid, comprising a soluble alginate, e. g., sodium alginate, and, if desired, a viscosity-reducer, is then introduced into the well through the tubing and is forced and, preferably, directed by packers or other suitable means into the water horizons by pumping another charge of oil down the tubing or by applying pressure to the well in any other manner. The treating liquid may, likewise, be introduced into the desired formation by dumping into the well by means of bailers, etc. The solution will diffuse into the formation water, forming the desired water and acid-insoluble plug within the formation by reaction with coagulating salts, such as alkaline earth or heavy metal salts, for example, calcium chloride, dissolved therein. If desired, the well may now be subjected to acid treatment, since the acid will not be able to enter the water horizon, and its effect will be confined to the oil horizon.

In using the method of this invention to seal off gas-bearing layers or for consolidating heaving or unstable formations, the same procedure as for water layers may be followed. If the gas-bearing or unstable formations are sufficiently wet with water containing coagulating salts as is often the case, the procedure is similar to that described above. If the formations are dry, or substantially dry, there may be introduced into the well and forced into the formation before or after the injection of the treating solution an aqueous solution of a coagulant, which may be one or more of the soluble metal salts of such metals as calcium, barium, chromium, copper, zinc, iron, aluminum, etc. However, the aluminum, calcium, and iron salts are preferred due to their relative cheapness and the character of the precipitates formed. Reaction of the soluble alginate with the introduced salts takes place as described above. This procedure may be applied to water-bearing layers as well.

In order to insure the formation of the insoluble precipitate as far back within the formation as possible, it may sometimes be desirable to introduce into the well and force into the formation a charge of a neutral material, such as oil, between the charges of the treating liquid and the salt solution. Packers, such as those well known in the art, may be used with advantage to direct the liquids into the desired formations.

The aqueous treating liquid for plugging water or gas-bearing layers preferably consists of or comprises about 1% solution of a soluble alginate, e. g., sodium alginate, and a small amount of a viscosity reducer, such as for example a mixture of equal amounts of sodium tannate and pyrophosphate. By including a viscosity reducer less pressure is required to force the treating liquid into the pores of the formation.

Reference may be had to Table III in calculating the amount of viscosity reducing agents to be included in the treating liquid. Table III shows the reduction in viscosity due to the addition of various amounts of several of these agents to sodium alginate solutions wherein the amounts are given in per cent by weight of the sodium alginate.

TABLE III

| Sample | Percent viscosity reducer | Viscosity in centipoises (Stormer viscometer) |
|---|---|---|
| 1% sodium alginate solution | None | 162.5 |
| Do | 1% NaOH | 111 |
| Do | 1% NaOH | 85 |
| Do | 1% sodium pyrophosphate | |
| Do | 1% NaOH | 42 |
| Do | 1% tannic acid | |
| Do | 1% NaOH | 40 |
| Do | 1% tannic acid | |
| Do | 1% sodium pyrophosphate | |

A greater reduction in viscosity can be obtained by using larger amounts of caustic soda, but the percentage should be kept low to avoid precipitation of the heavy metals as hydroxides.

Although the process of this invention has been described with regard to its uses in well drilling practice, it is obvious that it can equally well be applied for sealing off, rendering impervious to fluids or solidifying ground strata which do not lie in the proximity of wells. Thus, the present invention has many practical applications for example, in building canals, sluices or dykes in porous soil, where it is desirable to stop the percolation of water through the sand, or in constructing bridge pillars, landing piers, tunnels, etc., in ground formations which are not sufficiently firm or impervious.

We claim as our invention:

In a process for drilling a borehole through formations allowing an inflow of brine into the borehole, the step of circulating in the borehole a drilling fluid comprising a water-soluble alginate, an alkali hydroxide, and a water-soluble substance selected from the group consisting of organic materials of feebly acidic properties and alkali metal pyro- and metaphosphates.

HAROLD T. BYCK.
JOHN W. FREELAND.
HOWARD C. LAWTON.